June 6, 1967  E. W. PEARSON ET AL  3,323,401
TEMPERATURE COMPENSATED CONTROL MEANS
FOR PRESS BRAKES AND THE LIKE
Filed Oct. 6, 1965
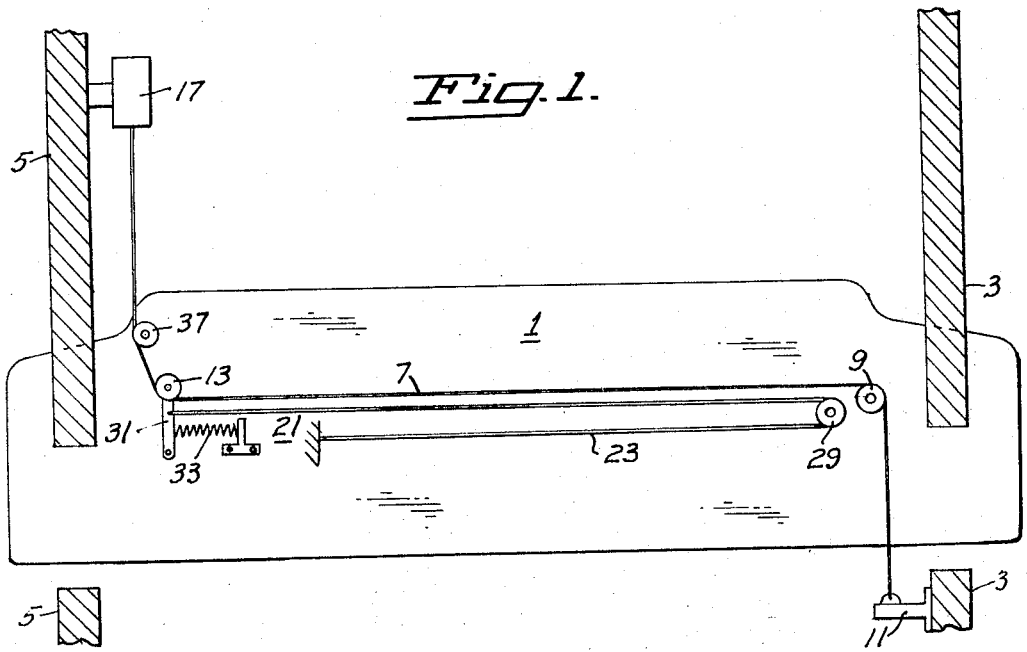
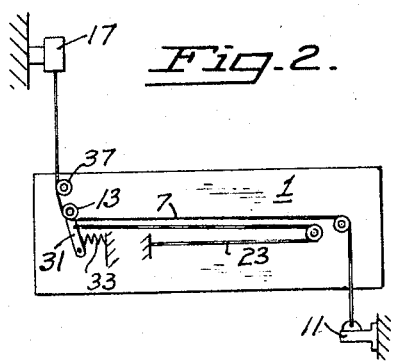
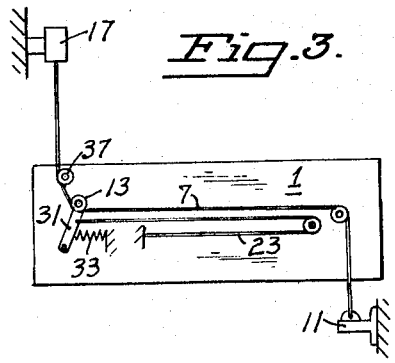
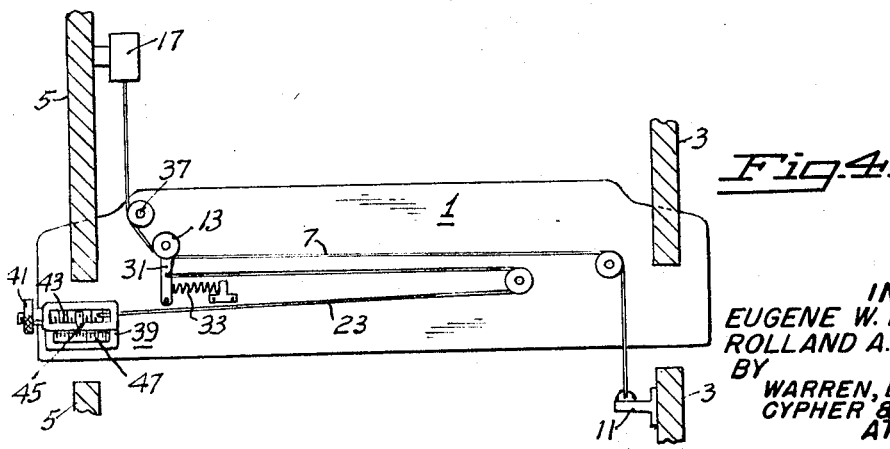
INVENTORS
EUGENE W. PEARSON
ROLLAND A. RICHARDSON
BY WARREN, BROSLER,
CYPHER & ANGLIM
ATTORNEYS

United States Patent Office 3,323,401
Patented June 6, 1967

3,323,401
TEMPERATURE COMPENSATED CONTROL MEANS FOR PRESS BRAKES AND THE LIKE
Eugene W. Pearson, Orinda, and Rolland A. Richardson, Alameda, Calif., assignors to Pacific Press & Shear Corp., a corporation of Illinois
Filed Oct. 6, 1965, Ser. No. 493,427
8 Claims. (Cl. 83—636)

Our invention relates to press brakes and like machines, and more particularly to a precision control for the ram of such press brake or like machine, where the ram is of substantial length.

In a press brake or like machine employing a ram of substantial length, power may be applied at each end, by means of hydraulically driven pistons. For accurate work, each end of such ram must travel at the same rate, as otherwise the ram will change its attitude in the course of its stroke. If the ram is intended to travel level, it will assume an angle, and if it should has been previously adjusted for operation at a desired angle, the angle will change. In either case, the work will either be defective or ruined.

One system of control which has been developed to maintain accuracy in the movement of such ram, involves a control tape of metal extending lengthwise of the ram, at one end, being wrapped about a guide sheave and directed downwardly to a fixed point of anchorage on the machine other than the ram itself, while at its other end, the tape is wrapped about a similar guide sheave to be directed upwardly for connection to a movable element of some suitable means for compensating for such undesired changes in the attitude of the ram, in response to such changes.

Such compensating means includes a sensing unit which may employ micro-switches or a very sensitive servo-valve assembly. If micro-switches are employed, the movable element may be a spring biased armature adapted to swing between a pair of micro-switches, the tape being normally stressed to mold the armature in a "neutral" position, while if the sensing unit is a sensitive servo-valve assembly, the movable element may be a spring biased spool-type valve which is also normally held to a "neutral" position by the tape.

So long as the summation of the two vertical components of the tape remains constant, the neutral position of the movable element of the sensing unit will persist.

Should the ram deviate from its initial attitude, however, the sum total of the vertical components of the tape will either increase or decrease, depending on the direction in which the attitude of the ram changes. The resulting change of status of the sensing unit is then employed to effect a compensating adjustment in the rate feed of hydraulic fluid to one or both cylinders in a manner which will effect the proper correction.

Depending on the size of the machine, the actual length of the tape may vary from six feet to thirty feet. As related to the mass of the ram, the mass of the tape becomes insignificant by comparison. So long as the ambient temperature in which the machine is functioning remains substantially constant, the tape control system will function with adequate accuracy. However, in view of the vast difference in the relative mass of the ram and control tape, any sudden changes in ambient temperature will affect the tape in a vastly shorter period of time than it will the ram. In fact, the rapidity of the relative change will be so great, that with respect to the tape, the ram may be considered as relatively unaffected, and the resulting variation in actual length of the control tape under such change of environment may be sufficient to stimulate the sensing unit and introduce a false correction in the attitude of the ram.

For example, let us assume a tape length of twenty feet and a rather sudden differential temperature between the tape and the ram of twenty degrees Fahrenheit. With a tape having a coefficient of expansion of only .0000065 inch per inch of length per degree Fahrenheit, the tape will change in length .031 inch. When the ram must be controlled to an accuracy of say .001 inch or even .002 inch in magnitude over the length of the ram, a change of .031 inch in the actual length of the control tape is a relatively large change.

The sudden changes in the temperature which could introduce such errors, may be occasioned by warm air currents from the drive motor on the machine, radiation from a hot power unit tank, cold blasts of air from an open door . . . etc. Unless precautions are taken to maintain a uniformity of ambient temperature under all conditions of operation of the machine, then other precautions must be taken to assure maintenance of accuracy.

Among the objects of our invention are:
(1) To provide a novel and improved temperature compensated control system;
(2) To provide a novel and improved temperature compensated control system admirably suited to controlling a heavy element such as the ram of a press brake or like machine;
(3) To provide a novel and improved ram control means for a press brake or like machine.

Additional objects of our invention will be brought out in the following description of a preferred embodiment of the same taken in conjunction with the accompanying drawings where:

FIGURE 1 is a rear view of a ram in association with the side housings of a machine, and depicting one form of the present invention as applied thereto;

FIGURES 2 and 3 are views similar to that of FIGURE 1 and depicting the mode of operation of the present invention when exposed to sudden changes in temperature in either direction;

FIGURE 4 is a view depicting an improvement to the invention as depicted in FIGURE 1, to enable a change in the rake angle of the ram.

Referring to the drawings for details of our invention, the same is illustrated as applied to the ram 1 of a machine such as a press brake, shear or the like, wherein such ram is associated with a pair of side housings 3, 5 and usually mounted on slideways carried by such side housings.

In the conventional operation of such machine, the ram is usually reciprocally driven by hydraulically operated pistons, all as illustrated and described for example, in the patent to Eugene W. Pearson for Shear Machine With Adjustable Ram Having Means to Immobilize Said Machine During Adjustment, Patent No. 3,181,407 of May 4, 1965. Such patent also illustrates and describes a tape control system of the type to which the present invention relates.

Specifically, and with reference to the drawings of the present application, a control tape 7 extends lengthwise of the ram, at one end, being directed downwardly about a guide sheave 9 mounted on the ram, for attachment to a fixed point on the machine, such as a bracket 11 on the side housing 3, while at its other end, the tape is guided upwardly about a sheave 13 for connection to a movable element of a sensing unit 17 in the control system, such sensing unit being mounted on the opposite side housing 5 of the machine.

When so installed, any deviation of the ram from its desired prevailing attitude, will either shorten or increase the effective length of such tape and stimulate the sensing unit from its pre-established adjustment to effect restoration of the ram to its desired attitude.

In the embodiment of FIGURE 1, the control tape is anchored to the side housing bracket 11 preferably by an adjustment for initially establishing neutral position of the movable element in the sensing unit 17, and said control tape is exposed to tensioning means 21 which is made responsive to temperature change in a manner which will correspond to relative change in length between the ram and the control tape attributable to temperature, and such tensioning means is employed to alter the effective length of the control tape, but just sufficiently to maintain the status quo of the compensating means, or in other words, maintain the compensating means unaffected by such relative change in length of the control tape.

Broadly, such tensioning means includes use of a temperature compensating tape 23 and means mounting such compensating tape under tension in an environment simulating that of the control tape, whereby the temperature compensating tape will react to temperature changes in a manner similar to that of the control tape 7. Thus may such reactions occurring in the compensating tape can then be utilized to nullify or compensate for the similar changes occurring in the control tape.

Specifically, the compensating tape should preferably be of the same material and of the same length as the control tape, so that it will react in like manner to temperature changes as the control tape, and in the embodiment of FIGURE 1, this compensating tape 23 is anchored at one end to the ram itself, then passes around a guide sheave 29 mounted adjacent the sheave 9 at one end of the ram and extends lengthwise along the ram in proximity to the control tape 7 and maintained under tension, by connecting the same to a lever 31 which is pivoted at one end to the ram and biased in the proper direction by a spring 33.

Such spring acting on the lever, will function to maintain the compensating tape under tension, whether such tape expands in response to an increase in temperature or whether it contracts, when exposed to a drop in temperature.

By coupling the control tape 7 to such tensioning means, the tensioning effect thereof may be transmitted to the control tape. However, it is to be noted, that the tensioning means remains under control of the compensating tape 23, and more specifically to the temperature responsive changes introduced therein as represented by the variations in actual length of the compensating tape due to exposure thereof to sudden temperature changes.

The coupling of the tensioning means to the control tape 7 is readily accomplished by supporting the guide sheave 13 at the free end of the tensioning lever 31 whereby said sheave becomes free to shift with respect to the ram and thus can compensate for actual changes in length of the control tape, corresponding to those developed in the compensating tape due to such temperature changes.

In FIGURE 2, the situation depicted therein represents how the apparatus functions in response to a sudden rise in temperature, which will result in an expansion of the compensating tape and a corresponding expansion of the control tape, they both being of substantially the same length and exposed to like temperature conditions. In the absence of the compensating means, the increase in length of the control tape due to expansion would permit the movable element of the sensing unit to function and introduce a false correction into the attitude of the ram, when such "correction" is not called for.

With the introduction of the tensioning means under control of the compensating tape, the actual increase in length of the control tape due to expansion thereof, can be taken up by increasing the path covered by the control tape while maintaining tension therein, and the tensioning means is so designed and adjusted as to maintain the status quo of the movable element of the sensing unit, or in other words, maintain the sensing unit unaffected by such increase in length of the control tape.

Similarly, with a sudden drop in temperature a condition will develop as depicted in FIGURE 3, wherein the resulting contraction of the compensating tape, will swing the tensioning lever in the opposite direction from that of FIGURE 2, and in doing so, will shorten the path or route covered by the control tape 7, just sufficiently to accommodate the actual contraction of this tape, while maintaining tension in the tape.

In either of the above instances, while the actual length of the control tape will vary, with the change in temperature, the change in the path or route covered by the control tape 7, as brought about by the tensioning means, will effect a compensation such as to maintain the status quo of the movable element of the sensing unit.

The setup described above, while it will forestall activation of the sensing unit when the actual length of the control tape changes relative to that of the ram, as when such components are exposed to sudden changes in temperature, such set up will not interfere with the normal functioning of the control tape in compensating for undesired changes in attitude of the ram, the control tape being free to function at all times in response to such undesired changes in attitude of the ram, to stimulate the sensing unit and bring about a correction in the conventional manner known to the art.

In a system utilizing a control tape 7 as depicted in FIGURE 1 of the drawings, it is desirable that the vertical component of the tape leading to the sensing unit should remain substantially vertical at all times. To assure this in the presence of the shiftable sheave 13, we propose to add a guide sheave 37 on the ram, above the sheave 13 and in vertical alignment with the sensing unit 17, the sheave 13 being supported somewhat to the right of the guide sheave 37 sufficiently to maintain the control tape in contact with the guide sheave 37 at all times, despite shift movements of the guide sheave 13.

At times, one may want to deliberately introduce a change in the rake angle of a ram. This is of particular significance in shears, where the angle of the upper blade, when properly related to the character of the material to be severed and the thickness thereof, will provide maximum efficiency in the cutting operation.

One manner of accomplishing this has been depicted in the aforementioned Pearson Patent No. 3,181,407, wherein an adjustment is provided for selectively increasing or decreasing tension in the control tape to effect a desired directional change in rake angle.

The present invention, however, lends itself to a simpler solution, involving merely the provision of means for effectively increasing or decreasing tension in the compensating tape 23. By so doing, the resulting swing of the lever 31 causes a shift of the sheave 13, which in turn, will either increase tension in the control tape by slightly forcing it to follow a slightly longer path, or cause a decrease in tension by allowing the control tape to occupy a slightly shorter path.

In each instance, this will cause a shift of the sensing unit element from its neutral position to a position of activating the compensating system, which under normal circumstances would effect a correction, but which now produces a change in rake angle. The magnitude and direction of which will depend upon the magnitude and direction of change introduced in the compensating tape 23.

To accomplish the foregoing, we substitute for the fixed anchor point of the compensating tape in the embodiment of FIGURE 1, an adjustable means which may take any one of a number of different forms. For simplicity sake, we prefer a slidable screw adjustment 39 involving a nut 41 rotatably secured to the surface of the ram, and a slidable screw 43 threaded through the nut and secured to an end of the tape 23 in any suitable manner.

This adjustment is preferably located at the extreme end of the ram, where it will be in proximity to other operator controls, and thus readily accessible to an operator. A pointer 45 on the screw in conjunction with a suitable scale 47, may be relied on in effecting desired adjustments.

From the foregoing description of our invention in its preferred form, it will be apparent that the same is subject to alteration and modification without departing from the underlying principles involved, and we accordingly do not desire to be limited in our protection to the specific details illustrated and described, except as may be necessitated by the appended claims.

We claim:

1. In a press brake or like machine employing a ram of substantial length in operation on work,
    a ram control system including a control tape coupled at one end to a point on said machine other than said ram, and at its other end to a spring biased movable element of a means for compensating for undesired changes in attitude of said ram in response to such changes, and means on said ram for guiding said tape and causing same to stimulate said compensating means in accordance with any change in attitude of said ram,
    and means responsive to temperature change in the vicinity of said control tape, for maintaining the status quo of said compensating means unaffected by such temperature change.

2. A press brake or like machine as recited in claim 1, wherein said temperature responsive means is adapted to control said tape just sufficiently to maintain the status quo of said compensating means unaffected by such temperature change.

3. A press brake or like machine as recited in claim 1, wherein said temperature responsive means is a tensioning means adapted to maintain tension in said control tape just sufficient to maintain the status quo of said compensating means unaffected by such temperature change.

4. A press brake or like machine as recited in claim 3, wherein said tensioning means includes a compensating tape, means mounting said compensating tape under tension in an environment simulating that of said control tape, and means transferring to said control tape, responses of said compensating tape to temperature changes and in a manner to nullify corresponding responses of said control tape to temperature changes.

5. A press brake or like machine as recited in claim 3, wherein said tensioning means includes a compensating tape similar to said control tape in length and temperature response characteristics, means mounting said compensating tape under tension on said ram, said mounting means including a spring acting on said compensating tape to maintain the same under tension, and means coupling said control tape under tension to said spring.

6. A press brake or like machine as recited in claim 1, and means for adjusting the rake angle of said ram.

7. A press brake or like machine as recited in claim 6, wherein said means for adjusting the rake angle of said ram comprises means for altering the effective tension of one of said tapes.

8. A press brake or like machine as recited in claim 6, wherein said means for adjusting the rake angle of said ram comprises an adjustable screw anchoring means at an end of one of said tapes.

References Cited

UNITED STATES PATENTS 3,152,503   10/1964   Pearson _____ 83—369 X

WILLIAM W. DYER, Jr., *Primary Examiner.*

JAMES M. MEISTER, *Examiner.*